US012676888B2

(12) United States Patent
Strogov et al.

(10) Patent No.: US 12,676,888 B2
(45) Date of Patent: Jul. 7, 2026

(54) VIRTUAL FILE HONEY POTS FOR COMPUTING SYSTEMS PROTECTION AGAINST RANSOMWARE ATTACKS

(71) Applicant: Acronis International GmbH, Schaffhausen (CH)

(72) Inventors: Vladimir Strogov, Singapore (SG); Aliaksei Dodz, Singapore (SG); Serg Bell, Costa del Sol (SG); Stanislav Protasov, Singapore (SG)

(73) Assignee: Acronis International GmbH, Schaffhausen (CH)

( * ) Notice: Subject to any disclaimer, the term of this patent is extended or adjusted under 35 U.S.C. 154(b) by 64 days.

(21) Appl. No.: 18/473,718

(22) Filed: Sep. 25, 2023

(65) Prior Publication Data

US 2025/0106251 A1 Mar. 27, 2025

(51) Int. Cl.
H04L 9/40 (2022.01)
(52) U.S. Cl.
CPC ................................ H04L 63/1491 (2013.01)
(58) Field of Classification Search
CPC .................................................. H04L 63/1491
See application file for complete search history.

(56) References Cited

U.S. PATENT DOCUMENTS

| | | | |
|---|---|---|---|
| 10,938,854 B2 | 3/2021 | Strogov et al. | |
| 10,944,791 B2 | 3/2021 | Livny et al. | |
| 11,032,319 B1 * | 6/2021 | Roundy ................. | G06F 21/62 |
| 11,050,787 B1 | 6/2021 | Sharifi Mehr | |
| 11,349,855 B1 | 5/2022 | Amit | |
| 11,611,586 B2 | 3/2023 | Strogov et al. | |
| 2018/0324214 A1 | 11/2018 | Schoenherr | |
| 2020/0089876 A1 * | 3/2020 | Aharoni ................ | G06F 21/554 |
| 2020/0106808 A1 * | 4/2020 | Schütz ................ | H04L 63/0263 |
| 2020/0204589 A1 * | 6/2020 | Strogov ............. | H04L 63/1416 |
| 2021/0360028 A1 * | 11/2021 | Chen Kaidi ........ | H04L 63/1408 |
| 2022/0294822 A1 * | 9/2022 | Shmelev ............. | H04L 63/1491 |
| 2024/0163312 A1 * | 5/2024 | Azad ....................... | H04L 63/20 |

FOREIGN PATENT DOCUMENTS

| | | |
|---|---|---|
| WO | WO-2022002405 A1 * | 1/2022 |

OTHER PUBLICATIONS

S. Kulkarni, M. Mutalik, P. Kulkarni and T. Gupta, "Honeydoop—a system for on-demand virtual high interaction honeypots," 2012 International Conference for Internet Technology and Secured Transactions, London, UK, 2012, pp. 743-747. (Year: 2012).*

Acronis. 8603: Acronis Products: Windows IoT support. https://kb. acronis.com/content/8603?ckattempt=2, Acronis Products_ Windows IoT support; Knowledge Base.pdf © 2003-2024 as accessed on Feb. 29, 2024.

* cited by examiner

*Primary Examiner* — Amir Mehrmanesh
*Assistant Examiner* — Thomas A Gyorfi
(74) *Attorney, Agent, or Firm* — ESPE Legal Consultancy FZ-LLC

(57) ABSTRACT

Virtual file honeypots (VFHs) are deployed to protect real files in a computing system. The storage footprint is reduced because the virtual file honeypots do not require storage resources. VFHs are generated to appear the same as other files in a computing system, presenting an attractive attack surface as bait to reveal malicious processes and agents. The VFHs are generated on-demand and are not backed up in system storage. The use of VFHs requires less storage capacity than real honeypot files and conserves computing system resources.

20 Claims, 2 Drawing Sheets

200

Identify CS environment
202

Determine VFH parameters
based on CS environment
204

Determine that a process is
untrusted
206

Generate VFH based on
parameters
208

Provide untrusted process
with VFH
210

Detect untrusted process as
malware
212

VIRTUAL FILE HONEY POTS FOR COMPUTING SYSTEMS PROTECTION AGAINST RANSOMWARE ATTACKS

TECHNICAL FIELD

Embodiments generally relate to malware and ransomware protection for computing systems (CS) with limited storage resources, such as Industrial Control Systems, Internet of Things (IoT) systems, and others. More particularly, embodiments relate to malware and ransomware protection using virtual file honeypots (VFHs).

BACKGROUND

Modern computing systems face a critical challenge in safeguarding their valuable data and operations against the ever-evolving threat of malware and ransomware attacks. Ransomware, for example, is typically malicious software that encrypts or blocks access to a system's files until a ransom is paid. Ransomware attacks have become a significant menace to computing systems, causing financial losses, operational disruptions, and potential data breaches. Existing approaches to ransomware protection often rely on resource-intensive methods that strain system storage capacity and negatively impact performance.

One prevalent strategy in ransomware protection involves the use of file system (FS) filters and volume filters to detect and respond to suspicious file modifications. These filters are designed to intercept and analyze file changes, enabling the system to proactively identify and mitigate potential ransomware threats. However, these approaches often necessitate extensive storage usage and input/output (I/O) operations, resulting in increased overhead and potential degradation of system performance.

File honeypots are another strategy to detect malicious agents. Honeypots are decoy files injected into filesystem directories to attract and identify suspicious processes. For example, U.S. U.S. Pat. No. 11,611,586 describes inserting file honeypots on a storage device along with real files to bait suspicious processes in an operating system environment to reveal themselves as malware.

Although known techniques using file honeypots are useful defenses against ransomware, the incorporation of file honeypots within the heuristics for detecting malicious activities presents its own set of challenges. File honeypots enhance detection capabilities by identifying and distracting malicious actors, but the creation and maintenance of file honeypots require careful consideration of storage resources and I/O demands. File system and volume filter drivers cannot distinguish real files from file honeypots when mixed on the same storage device. Thus, honeypots are treated the same as other files and are snapshotted together with a system's files. As the use of honeypots increases to protect a system, the burden on storage overhead also increases.

Generating effective file honeypots that convincingly mimic real files poses yet another hurdle. Each computing system, for example, Industrial Control Systems (ICS) or Internet of Things (IoT) systems, has unique characteristics. It is challenging to create file honeypots that seamlessly integrate into the system's file ecosystem.

Moreover, some industries employ computing systems that typically have very limited storage resources. For example, Building Automation Systems (BAS), Healthcare Control Systems, Telecommunications Infrastructure, and Transportation Control Systems, are usually designed with less storage resources than systems designed for other applications. Lean systems have an even greater need for ransomware protection solutions that both heighten detection rates and reduce false positives without imposing undue strain on storage capacity and I/O operations.

Therefore, there is a need for improved malware and ransomware protection using virtual file honeypots.

SUMMARY

Virtual file honeypots (VFHs) are mixed with real files to lure malicious processes into revealing themselves. The storage footprint is reduced because the virtual file honeypots are not backed up on a storage device and thus do not require storage resources. At the same time, VFHs appear to untrusted processes as if they are traditional files, enabling accurate and efficient threat detection without significantly affecting storage capacity and input/output (I/O) operations.

In an embodiment, a method for protecting computing systems (CS) against malware, including ransomware attacks, by using virtual file honeypots (VFHs) under virtual honeypot driver control includes identifying the computing system (CS) environment, determining VFH parameters based on the CS environment, determining that an untrusted process is requesting access to system files of the CS, generating a VFH based on the determined parameters, providing the untrusted process with a plurality of VFHs mixed with real system files, and detecting untrusted process as malware by performing heuristic analysis.

In an embodiment, determining that the process is untrusted comprises determining whether the process is not identified in a list of trusted processes based on one or more of a certificate, fingerprint, name, and process identifier.

In an embodiment, determining that the process is untrusted comprises requesting a reputation service. This determination may also be made by analyzing chain of processes and identifying the process was created by untrusted process:

In an embodiment, determining that the process is untrusted comprises detecting untrusted threads in trusted processes.

In an embodiment, determining virtual file honeypot parameters comprises applying a machine learning classifier to the information about the CS environment.

In alternative embodiments, the identification of the CS environment comprises receiving identifying information about a CS type, a CS name, a CS version, an operating system type or an operating system version, file types and extensions, common file names, file content, or directory structure, access permissions of files and directories within the CS, creation, modification, and access timestamps within the CS, sensitive data within the CS, file interactions with other components in the CS, regulatory and compliance requirements of the CS, or past cybersecurity incidents or known vulnerabilities within the CS environment.

In alternative embodiments, the CS environment is an Industrial Control System (ICS), an Internet of Things (IoT) system, a Building Automation Systems (BAS), a Healthcare Control System, a Telecommunications Infrastructure, or a Transportation Control System, an Enterprise Security System, or a Consumer Security System.

An embodiment includes a system for detecting malware in a computing system (CS) environment using a processor. The system comprises a virtual honeypot driver under control of the processor and linked with a nonvolatile storage medium, wherein the virtual honeypot driver is configured to control access by a process running on the CS to system files on the nonvolatile storage medium. The system also comprises a real file, backed up on the nonvolatile storage medium, and a virtual file honeypot, generated by the virtual honeypot driver, not backed up on the nonvolatile storage medium. The virtual file honeypot is generated by the virtual honeypot driver with parameters specific to the CS. When the process requests access to a CS file system containing the real file, the virtual honeypot driver is configured to present a plurality of virtual file honeypots to the process after determining that the process is untrusted. The virtual honeypot driver is also configured to perform heuristic analysis of the untrusted process after the untrusted process is given access to the virtual file honeypot.

In an embodiment, the virtual honeypot driver is configured to determine that the process is untrusted by determining whether the process is not identified in a list of trusted processes based on one or more of a certificate, fingerprint, name, and process identifier. In an embodiment, the virtual honeypot driver is configured to determine that the process is untrusted by requesting a reputation service, by analyzing a chain of processes and identifying that the process was created by an untrusted process, or by detecting untrusted threads in trusted processes.

In alternative embodiments, the CS environment is an Industrial Control System (ICS), an Internet of Things (IoT) system, a Building Automation Systems (BAS), a Healthcare Control System, a Telecommunications Infrastructure, or a Transportation Control System, an Enterprise Security System, or a Consumer Security System.

In an alternative embodiment, the invention is implemented by a method for controlling access to system files in a computing system (CS) environment using virtual file honeypots (VFHs) under virtual honeypot driver control. The method comprises identifying the computing system (CS) environment, determining VFH parameters based on the CS environment, determining that a process requesting file access is untrusted, generating a VFH based on the determined parameters, providing the untrusted process with the VFH and the requested file; and detecting the untrusted process as malware by performing heuristic analysis after the untrusted process receives access to the VFH.

In an alternative embodiment, determining that the process is untrusted comprises determining whether the process is not identified in a list of trusted processes based on one or more of a certificate, fingerprint, name, and process identifier, by requesting a reputation service, by analyzing chain of processes and identifying the process was created by untrusted process, by detecting untrusted threads in trusted processes, In an embodiment, determining VFH parameters comprises applying a machine learning classifier to the information about the CS environment.

In an embodiment, identification of the CS environment comprises receiving identifying information about a CS type, a CS name, or a CS version, or about an operating system type or an operating system version.

In alternative embodiments, the identification of the CS environment comprises receiving identifying information about a CS type, a CS name, a CS version, an operating system type, an operating system version, file types and extensions, common file names, file content, or directory structure, access permissions of files and directories within the CS, creation, modification, and access timestamps within the CS, sensitive data within the CS, file interactions with other components in the CS, regulatory and compliance requirements of the CS, or past cybersecurity incidents or known vulnerabilities within the CS environment.

In alternative embodiments, the CS environment is an Industrial Control System (ICS), an Internet of Things (IoT) system, a Building Automation Systems (BAS), a Healthcare Control System, a Telecommunications Infrastructure, a Transportation Control System, an Enterprise Security System, or a Consumer Security System.

The above summary is not intended to describe each illustrated embodiment or every implementation of the subject matter hereof. The figures and the detailed description that follow more particularly exemplify various embodiments.

BRIEF DESCRIPTION OF THE DRAWINGS

Subject matter hereof may be more completely understood in consideration of the following detailed description of various embodiments in connection with the accompanying figures, in which.

Figure 1:
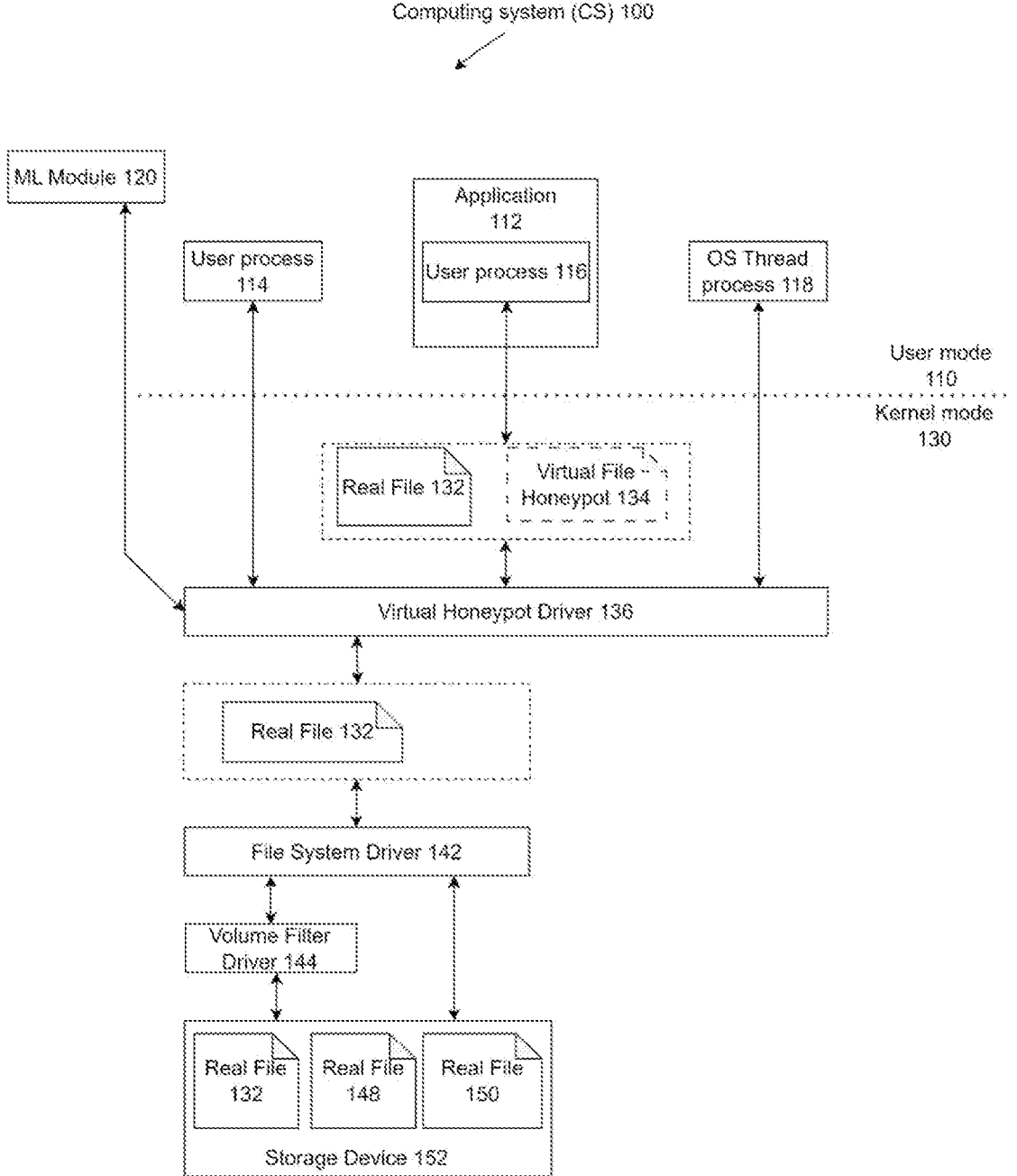
FIG. 1 is a block diagram of a computing system for deployment of virtual file honeypots, according to an embodiment.

While various embodiments are amenable to various modifications and alternative forms, specifics thereof have been shown by way of example in the drawings and will be described in detail. It should be understood, however, that the intention is not to limit the claimed inventions to the particular embodiments described. On the contrary, the intention is to cover all modifications, equivalents, and alternatives falling within the spirit and scope of the subject matter as defined by the claims.

DETAILED DESCRIPTION

Virtual file honeypots (VFHs) protect a computing system (CS) from malware without adding to system overhead. In an exemplary embodiment, a VFH system is deployed to prevent a hypothetical ransomware attack. In this example, the ransomware is designed by a hacker to encrypt system files such that a decryption key known only to the hacker can be sold at an extortionate price to the owner of the files. The computing system generally comprises a storage device with a plurality of files that are accessed for reading and writing by a variety of processes in user space. Access control takes place in kernel space and employs a virtual honeypot driver to manage virtual file honeypot creation.

The virtual honeypot driver sits between processes seeking to access files on a storage device and the storage device itself. The virtual honeypot driver is configured to identify distinguishing parameters of the CS environment to be protected. One or more of these distinguishing parameters are used by the virtual honeypot driver when virtual file honeypots are created to ensure that the virtual file honeypots match the CS environment.

When a user-side process seeks access to a storage device in the CS environment, the virtual honeypot driver makes an initial determination whether the process is untrusted. If the process is untrusted, the virtual honeypot driver generates virtual file honeypots on-demand, using the CS parameters, and provides the untrusted process with access to the virtual file honeypots. In an embodiment, the virtual honeypot driver gives access to real files and virtual file honeypots. The ratio of real files to virtual file honeypots can be varied depending on the level of potential threat. For example, a process that is highly likely to be malicious can receive access only to virtual file honeypots. Other, less obviously malicious processes can receive access both to real files and virtual file honeypots. The proportion of real files to virtual file honeypots can be fixed or varied depending on the perceived risk presented by the untrusted process.

When the untrusted process has access to files, heuristic analysis takes place by examining file-related behavior and characteristics indicative of malicious activity. In the context of ransomware, for example, heuristic analysis aims to detect ransomware attacks by identifying patterns and behaviors that deviate from normal or expected file operations. Certain kinds of heuristic analysis are typically performed when analyzing ransomware attacks for indicia of malicious intent. One example is rapid mass encryption, where a large number of files are rapidly encrypted within a short period. Such behavior is indicative of ransomware trying to encrypt as many files as possible as fast as possible. In addition, determining that encryption of the data is occurring can be based on monitoring the entropy of the monitored data. If the entropy of the data is observed to be growing faster than a predetermined threshold rate, the entropy growth rate can be identified as a sign of ongoing encryption. Another example is the use of unusual file extensions. Ransomware often appends new and unusual file extensions to encrypted files. Heuristic analysis monitors for sudden and widespread changes in file extensions across the system. Inconsistent file modification is another sign of malware. Ransomware may modify files across different directories or drives in an inconsistent manner. Heuristic analysis identifies unusual modification patterns that suggest malicious file encryption. Simultaneous file access is another sign of malware. When multiple files accessed simultaneously by a process that typically doesn't exhibit such behavior, heuristic analysis can flag such file access as suspicious. Changes in file creation/modification timestamps also suggest ransomware attacks, which can result in the modification of file timestamps, particularly creation and modification times. Heuristic analysis detects abrupt and widespread changes in these timestamps. Another sign of malware is unusual file activity at off-hours. Ransomware attacks are often timed to occur during off-peak hours to avoid immediate detection. Heuristic analysis can give increased scrutiny to file activities that occur at unusual times. A high volume of file writes is also a sign of malware. Ransomware encrypts files by writing encrypted data. Thus, heuristic analysis looks for an unusually high volume of file write operations.

In an embodiment, heuristics used in classification include patterns of full file read, combined delete and create operations, renaming special file extensions, or MIME type changes as the result of file write operations. These operations, when encountered, contribute to the classification of a session as potentially malicious or unsafe. In an embodiment, full-read, delete, and create as a classification heuristic accounts for matching create operations for the full read and delete operation pairs in order to reduce false positives.

These heuristics require access to the file content after modification. The virtual honeypot driver stores file content information after modification. Thus, there is no need to preserve content before the modification because the virtual honeypot driver knows how the content was initially generated.

The virtual honeypot driver adds virtual file honeypots to real files to attract and draw out suspicious processes. The inserted virtual file honeypots are used for heuristics and are not snapshotted or backed up.

Although a traditional file honeypot may be considered a "virtual" file in the sense that it mimics a real system file, the term "virtual" in the context of a virtual file honeypot does not concern mimicry of real system files. The virtual aspect of a virtual file honeypot driver refers to technical characteristics of the file honeypot. For example, a virtual file honeypot differs from traditional honeypots because it lacks backup storage or any physical presence of its own within the real filesystem to be protected. Further, a virtual file honeypot is also virtual in the sense that it is generated on-demand in response to a process and may have variable characteristics depending on the specific system or context. Thus, a virtual file honeypot is ephemeral in that it is created on-demand and does not persist in system storage.

In some embodiments, VFHs are used instead of traditional honeypots. In other embodiments, the leveraging of VFHs for heuristics is balanced between traditional file honeypots and VFHs. In these mixed systems, the storage footprint and storage I/O demands associated with VFH integration are reduced in these embodiments in proportion to the percentage of VFHs to traditional file honeypots. Thus, the ratio of VFHs to traditional honeypots can be tuned as required by overall performance needs.

In an embodiment, system-specific VFHs cater more specifically to different computing environments. System-specific VFHs accurately and efficiently increase threat detection while preserving system resources. Even systems that usually lack resources for robust honeypot defenses can be given improved defenses against ransomware attacks because system-specific VFHs can be deployed efficiently and do not unduly burden system performance.

In an embodiment, the VFHs are used to protect a general endpoint system. An endpoint comprises a remote computing device that communicates back and forth with a network to which it is connected. Examples of endpoints include desktops, laptops, smartphones, tablets, servers, workstations, and Internet-of-things (IoT) devices.

For example, general endpoint for an Amazon S3 bucket may have the structure: https://s3.amazonaws.com/bucket-name, where https://s3.amazonaws.com is the general endpoint and "bucket-name" is the name of a particular remote user's bucket. The general endpoint system allows data stored in a named bucket to be accessed and managed by sending requests to the general endpoint URL. This system enables communication between a user's local machine and a cloud storage service by way of the general endpoint.

Consumer and enterprise systems comprising endpoints may be protected by VFHs. A user of such systems interacts with clients, a computer hardware device or software that accesses services available from a host computer. A host computer, typically with an assigned IP address, provides data or services over a network. A server is a type of host that may be configured for different purposes, such as a file server, a database server, or web server.

In an alternative embodiment, a consumer system comprises a device such as a desktop computer, laptop, smartphone, or tablet with an installed security solution using VFHs. In another embodiment, an enterprise system comprises a VFH security system that protects endpoints, servers, workstations, and virtual machines from unauthorized access by user client devices.

An exemplary computing system 100 configured for defensive use of virtual file honeypots is shown in FIG. 1. More particularly, FIG. 1 is a block diagram of the computing system 100 configured for deployment of virtual file honeypots, according to an embodiment. The computing system 100 generally comprises one or more processors and nonvolatile storage media in a networked configuration so that computing resources are available to system users. The system 100 includes a user mode 110 where applications and processes originate. In FIG. 1, for example, application 112 runs in user mode 110 along with a number of possible processes. For example, process 114 runs in user mode 110 while application 112 has an associated user process 116. Operating system (OS) thread process 118 also runs in user mode 110.

Machine learning (ML) module 120 is also associated with user mode 110 and will be described in detail below. For illustration purposes, FIG. 1 focuses on a single user process 116 whose request for file access passes to kernel mode 130 for approval. Virtual honeypot driver 136 mediates the request by user process 116 for file access. In a typical embodiment, virtual honeypot driver 136 responds by giving access to real files mixed with virtual file honeypots. For purposes of illustration, virtual file honeypot 134 and real file 132 are representative. Virtual file honeypot 134 is generated by virtual honeypot driver 136 with parameters specific to CS 100. There is no copy or version of virtual file honeypot 134 on storage device 152. Real file 132 on storage device 152 is obtained by virtual honeypot driver from file system driver 142, either directly or by way of volume filter driver 144. Thus, virtual honeypot driver 136 is able to serve both real files and virtual file honeypots to a process requesting access to storage device 152. Process requests lack direct access to storage device 152 and cannot tell the difference between real files and virtual file honeypots. But virtual honeypot driver 136 monitors activity by requesting processes on the virtual file honeypots and conducts heuristic analysis to determine whether a given process is acting on files in a way indicative of malware.

FIG. 1 is an embodiment where a request by user process 116 to access files is answered by giving access to representative real file 132 and representative virtual honeypot file 134 under supervision of virtual honeypot driver 136. In other embodiments, the request for access can be made by user process 114 independent of a specific application. Or the request for access may be made by representative OS thread process 118. In those cases, the request for access is also supervised by virtual honeypot driver 136 in a similar manner as with user process 116.

Real file 132 is also managed in kernel mode 130 by file system driver 142 and volume filter driver 144. Both drivers 142 and 144 manage real files 132, 148, and 150 on storage device 152. For purposes of illustration, only real files 132, 148, and 150 are shown in FIG. 1. In most implementations, the number of files will be much larger. File system driver 142 manages the entire storage device 152 and its filesystems. Volume filter driver 144 manages volumes within those filesystems. The volume filter driver 144 detects when changes by a file request are made on a block level of the storage and generates a backup file by copying original values of the changed sectors to free space within data storage according to a copy-on-write (COW) operation. In a copy-on-write operation, when the modification request is made, the original data may be copied into a new storage area, and then the original data block is modified.

Virtual honeypot driver 136 protects the files on storage device 152 by screening access requests by files originating in user mode 110. In the embodiment shown in FIG. 1, virtual honeypot driver 136 has already been configured and has already identified CS 100 and its parameters. User process 116 has requested access to real files and virtual honeypot driver 136 has determined that process 116 is untrusted. Virtual honeypot driver 136 thus provides virtual file honeypots to the untrusted process on-demand. The mix of real files and virtual file honeypots are represented in FIG. 1 by real file 132 and virtual file honeypot 134. The on-demand virtual file honeypots are generated by virtual honeypot driver 136 to have characteristics and parameters such that they are indistinguishable from real system files to would-be malicious agents.

Machine learning (ML) module 120 interacts with virtual honeypot driver 136 to improve generation of virtual file honeypots by virtual honeypot driver 136. For example, in an embodiment ML module 120 uses a machine learning model trained to identify and predict details about files in CS 100. For example, patterns in file naming, structure, and content on storage device 152 can be used to train a machine learning model associated with ML module 120 so that virtual honeypot driver 136 can use the results to create plausible sounding virtually file honeypots with file names, representative file structures, and file content that closely resembles real files on storage device 152. The system 100 is configured so that ML module 120 has access to virtual honeypot driver 136 so that the result of analysis can be conveyed to and used by virtual honeypot driver 136. In an alternative embodiment, the role of ML module 120 is supplemented in whole or in part by a threat-intelligence service.

Figure 2:
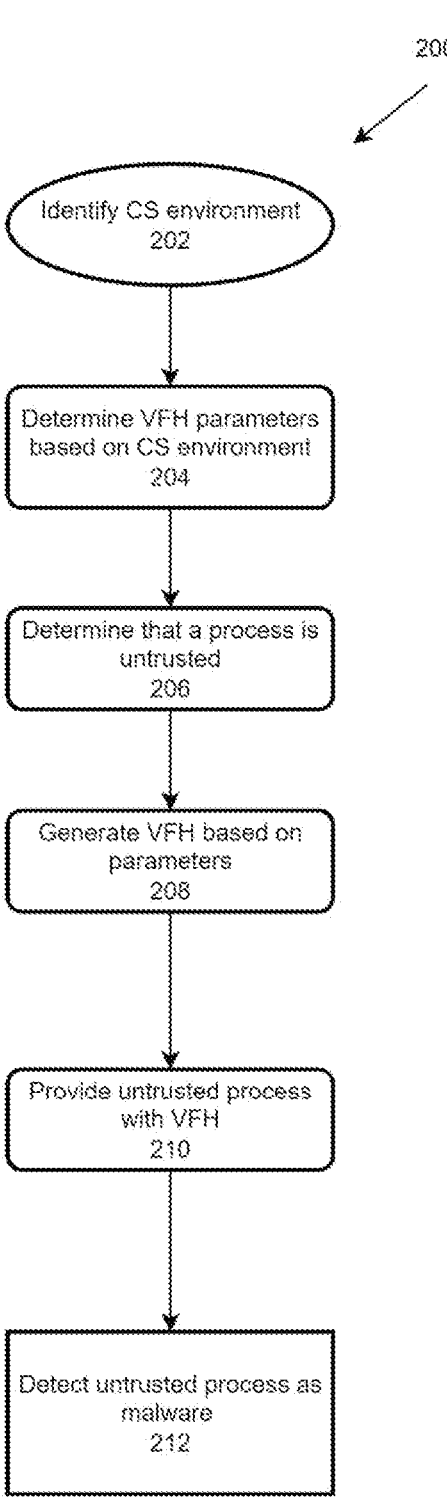
FIG. 2 is a flowchart of a method of deploying virtual file honeypots to protect a computing system, according to an embodiment.

Referring to FIG. 2, a flowchart of a method 200 for malware detection by way of virtual file honeypots under virtual honeypot driver control is depicted, according to an embodiment. The VFH will be generated in accordance with details of the CS to be protected. The method 200 of FIG. 2 can be implemented by a system, such as system 100 shown in FIG. 1, that has been pre-configured with a virtual honeypot driver, such as virtual honeypot driver 136. Before a process requests access to system files, the virtual honeypot driver has identified the CS environment at operation 202. Specific VFH parameters are determined based on these parameters at operation 204. These VFH parameters ensure that the virtual file honeypots closely mimic real files on the system to be protected and real directories within the CS environment. In an embodiment, the parameters are chosen from file types and extensions, common file names, file content, directory structure, access permissions, timestamps, sensitive data patterns, interactions with other components, regulatory and compliance requirements, and knowledge of known vulnerabilities and past cybersecurity incidents within a particular CS environment.

Based in part on the CS environment and expected behavior of processes in the CS, an initial determination is made at operation 206 that a requesting process is untrusted. For example, a user process that attempts to bulk rename or encrypt files would be unusual and untrusted in many CS environments. The determination whether a file is untrusted may be made in whole or in part by a ML module. A threat-detection service or known malware attributes may also be considered by the virtual honeypot driver when making this determination.

In response to an untrusted file's request for file access, the virtual honeypot driver generates virtual file honeypots in accordance with VFH parameters at operation 208 and provides the virtual file honeypots to the untrusted process at operation 210. Malware detection takes place at operation 212 by observation of the untrusted process.

In embodiments directed to general endpoint protection, the user mode and kernel mode configuration is adapted to endpoint systems. For example, and referring again to FIG. 1, user requests via client devices take place in user mode 110 while virtual honeypot driver filtering and file access take place in kernel mode 130.

In an exemplary embodiment, the virtual honeypot driver adds on-demand VFH based on CS parameters to real system files and gives the untrusted process access to the real and virtual files. In alternative embodiments, the virtual honeypot driver gives access only to VFH. In these embodiments, the decision to restrict access to real files is made based on the degree of risk associated with the untrusted process.

In a further embodiment, machine learning (ML) techniques generate parameters for a CS environment, enhancing the adaptability and accuracy of the virtual file honeypots to suit the specific CS environment. The ML models are trained in accordance with the CS environment. For example, ML models for ICS are trained on datasets specific to industrial control environments, incorporating known vulnerabilities and attack patterns relevant to ICS. For IoT applications, ML models are trained on datasets from IoT device interactions and threats, focusing on the distinct characteristics and challenges of IoT security.

In an embodiment, specific, CS-specific virtual file honeypot parameters are determined and virtual file honeypots are generated using these parameters. These decoy virtual files emulate real files, enhanced by parameter selection, creating the appearance of an attractive attack surface for malicious processes and agents.

In an embodiment, the virtual honeypot driver generates a reply to the untrusted process based on the context of the processes' request in the CS's history and what the process is looking for. In some of these embodiments, previous attacks on the CS are considered in the context of determining VFH parameters based on the CS environment.

In an embodiment, parameters include file types commonly used in the CS environment to be protected, including corresponding extensions. For example, if a particular CS frequently deals with configuration files or logs, virtual honeypots with these extensions are deployed.

In an embodiment, file naming conventions within a CS generate virtual file honeypots with filenames matching these conventions. Examples of file naming conventions include how system critical components, processes, or applications are named.

In an embodiment, content present in common CS files creates virtual file honeypots with similar content, making the honeypots realistic and attractive to potential attackers.

In an embodiment, the hierarchical directory structure of a CS is used to create virtual honeypots that follow the same hierarchical structure as the real directories of the CS.

In an embodiment, access permissions of files and directories within a CS are used as parameters virtual file honeypots. These access permissions make the virtual file honeypots appear legitimate to potential attackers.

In an embodiment, creation, modification, and access timestamps used in a CS are added to virtual file honeypots so that the honeypots resemble actively used files within the CS. For example, timestamps in the range of timestamps of actively used files within the CS can be used.

In an embodiment, sensitive data used within the CS is modeled in the virtual file honey pots. The honeypots have the appearance of containing valuable information including mimicking such sensitive data.

In an embodiment, file interactions with other components in a CS are modeled with virtual file honeypots that mimic these interactions.

In embodiment, specific regulations and compliance requirements relevant to a CS environment are modeled into the content and structure of virtual file honeypots. The apparent presence of file content and structure that matches industry standards for the CS environment enhances the honeypot's effectiveness.

In an embodiment, a known vulnerability within CS environments is present in a virtual file honeypot. For example, the virtual file honeypot can have characteristics of outdated or unpatched applications with known vulnerabilities. The virtual file honeypot can include unencrypted data where encrypted data would be expected or use a default configuration that would typically be customized under best practices for security.

In some embodiments, the CS environment is an Industrial Control System (ICS). More particularly, an ICS is an electronic control system and associated instrumentation used for industrial process control. Control systems can range in size from a few modular panel-mounted controllers to large interconnected and interactive distributed control systems (DCSs) with many thousands of field connections. Control systems receive data from remote sensors measuring process variables (PVs), compare the collected data with desired setpoints (SPs), and derive command functions that are used to control a process through the final control elements (FCEs), such as control valves. Larger systems are often implemented by supervisory control and data acquisition (SCADA) systems, or DCSs, and programmable logic controllers (PLCs). SCADA and PLC systems are also scalable down to smaller systems with few control loops. When VFH creation takes place in an ICS, the system-identification process takes into account the unique characteristics of ICS, such as specialized file types, directory structures, and communication protocols commonly found in industrial settings.

In some embodiments, the CS is an Internet of Things (IoT) system. IoT generally refers to sensors, processing ability, software, and technologies that connect and exchange data with other devices and systems over the Internet or other communications networks. IoT includes electronics, communication and computer science engineering, using technology that connects the digital and physical worlds. For example, an object is fitted with sensors that monitor temperature or motion. The object can also include actuators, which receive signals from the sensors and then take action in response to those signals. As generally implemented, IoT technologies and products present an attractive attack surface for malicious actors. IoT systems also generate large amounts of data but need quick access to this data without affecting system performance. At the same time, IoT systems usually avoid traditional data storage models, where large amounts of data are stored in one place. For an IoT system, the system-identification process considers the distinctive features of IoT devices and networks, which can include different file types, naming conventions, and communication patterns compared to ICS.

The system-identification process works similarly for other CS environments by incorporating distinctive features of the environment into the VFHs. For example, the CS environment may be a Building Automation Systems (BAS). BAS often have limited storage resources. Virtual file honeypots are a particularly effective security solution for BAS to minimize the storage footprint while maintaining protection against ransomware threats. BAS, also known as building management systems (BMS) or building energy management systems (BEMS), are typically used to control a building's heating, ventilation and air conditioning (HVAC), electrical, lighting, shading, access control, security systems, and related systems. These systems combine the control of various building automation functions with common control interfaces. For example, a smart building system connects sensors and devices to work in coordination to share data for managed building ecosystems in real time. Leveraging building data and applying artificial intelligence and machine learning (AI/ML) to the data makes the building both programmable and responsive to the needs of the users and the building manager.

Healthcare Control Systems (HCS) are another example of systems with distinctive features that can be incorporated into VFHs. These systems are traditionally used in healthcare settings, often with limited storage capabilities, that provide software and mobile applications combining real-time, workflow control technologies with best practices used in manufacturing and transportation. HCSs can improve collaboration, patient outcomes, surgeon outreach, utilization, revenue, and profit. Some healthcare organizations have various types of specialized hospital information systems such as electronic health records (EHR) systems, e-prescribing systems, practice management support systems, clinical decision support systems, radiology information systems and computerized physician order entry (CPOE) systems. Virtual file honeypots enhance the security of these systems without significant storage overhead.

Yet another system type with distinctive features that can be incorporated into VFHs is that of telecommunications infrastructures. Telecommunication infrastructures are known to have limited storage capacity, especially in remote or rural areas. At the same time, telecommunications infrastructures comprise the physical medium through which internet traffic flows, including telephone wires, above and below-ground cables, submarine cables, satellites, microwaves, and mobile technology including latest generation mobile networks such as 5G. Network infrastructure refers to the hardware and software that enable network connectivity and communication between users, devices, applications, and the internet. Telecommunications infrastructure services provide setup, maintenance, and consulting for data and voice communications technologies. Examples of telecommunications infrastructure services include optical fiber installation, cell tower site location, radio antenna testing, installation of standard phone equipment and data networks. These systems present attractive attack surfaces for malicious actors. Virtual file honeypots serve as a viable security measure for these systems because of reduced storage requirements.

Transportation control systems provide another example of a distinctive system for the creation of VFHs. Such systems generally have limited storage resources due to their specialized nature. Transportation control systems are used to manage and optimize flow of traffic on roads, highways, and similar transportation networks. Transportation control systems use sensors, cameras, and communication networks to collect real-time data on traffic conditions and vehicle movements. This data is analyzed and used to control traffic signals, variable message signs, and other traffic management devices. Transportation control systems can also be used to manage public transportation networks, such as buses and trains. These systems can provide real-time information on vehicle locations and arrival times, allowing passengers to plan their journey's more effectively. Transportation control can also be used to optimize routes and schedules, improving the efficiency of public transportation networks. Virtual file honeypots offer an efficient way to protect these systems without increasing the storage footprint.

The invention claimed is:

1. A method for protecting computing systems (CS) against ransomware attacks using virtual file honeypots (VFHs) under virtual honeypot driver control, the method comprising:

identifying the computing system environment;

determining VFH parameters based on the CS environment;

determining that an untrusted process is requesting access to system files of the CS, the system files stored on a storage device, and determining a level of risk posed to the computing system by the untrusted process;

generating a VFH based on the determined parameters, wherein the VFH is not stored on the storage device;

in response to determining the untrusted process is untrusted, providing the untrusted process access to a plurality of VFHs mixed with real system files, wherein a proportion of VFHs to real system files is varied based on the level of risk posed to the computing system by the untrusted process; and detecting the untrusted process as malware by performing heuristic analysis.

2. The method of claim 1, further comprising determining that a process is the untrusted process including at least one of:

determining whether the process is not identified in a list of trusted processes based on one or more of a certificate, a fingerprint, a name, or a process identifier;

requesting a reputation service for the process; or analyzing a chain of processes and identifying that the process was created by an untrusted process.

3. The method of claim 1, further comprising determining that a process is the untrusted process including detecting untrusted threads in trusted processes.

4. The method of claim 1, wherein determining virtual file honeypot parameters comprises:

training a machine learning classifier on at least one pattern in file naming on the storage device, at least one file structure of the storage device, and file content of the storage device; and applying a machine learning classifier to information about the CS environment to determine:

at least one plausible sounding file name, at least one plausible file structure, and at least one plausible file content.

5. The method of claim 1, wherein the identifying the CS environment comprises receiving identifying information about a CS type, a CS name, or a CS version.

6. The method of claim 1, wherein the identifying the CS environment comprises receiving identifying information about an operating system type or an operating system version.

7. The method of claim 1, wherein the identifying the CS environment comprises receiving identifying information about at least one of:

file types and extensions;

common file names, file content, or directory structure;

access permissions of files and directories within the CS;

creation, modification, and access timestamps within the CS;

sensitive data within the CS;

file interactions with other components in the CS;

regulatory and compliance requirements of the CS; or past cybersecurity incidents or known vulnerabilities within the CS environment.

8. The method of claim 1, wherein the CS environment is:

an Industrial Control System (ICS);

an Internet of Things (IoT) system;

a Building Automation Systems (BAS);

a Healthcare Control System;

a Telecommunications Infrastructure;

a Transportation Control System;

an Enterprise Security System; or a Consumer Security System.

9. A system for detecting malware in a computing system (CS) environment using a processor, the system comprising:

a virtual honeypot driver under control of the processor and linked with a nonvolatile storage medium, wherein the virtual honeypot driver is configured to control access by a process running on the CS to system files on the nonvolatile storage medium;

a real file, backed up on the nonvolatile storage medium;

a virtual file honeypot, generated by the virtual honeypot driver, not backed up on the nonvolatile storage medium, wherein the virtual file honeypot is not stored on the nonvolatile storage medium;

wherein virtual file honeypot is generated by the virtual honeypot driver using parameters specific to the CS; and wherein when the process requests access to a CS file system containing the real file, the virtual honeypot driver is configured to give access to a plurality of virtual file honeypots mixed with real system files to the process after determining that the process is untrusted and determining a level of risk posed to the system by the untrusted process, wherein a wherein a proportion of virtual file honeypots to real system files is varied based on the level of risk; and wherein the virtual honeypot driver is configured to perform heuristic analysis of the untrusted process after the untrusted process is given access to the virtual file honeypot.

10. The system of claim 9 wherein the virtual honeypot driver is configured to determine that the process is untrusted by:

determining whether the process is not identified in a list of trusted processes based on one or more of a certificate, a fingerprint, a name, or a process identifier;

requesting a reputation service; or analyzing a chain of processes and identifying the process was created by an untrusted process.

11. The system of claim 9, wherein the virtual honeypot driver is configured to determine that the process is untrusted by detecting untrusted threads in trusted processes.

12. The system of claim 9, wherein the CS environment is:

an Industrial Control System (ICS);

an Internet of Things (IoT) system;

a Building Automation Systems (BAS);

a Healthcare Control System;

a Telecommunications Infrastructure;

a Transportation Control System;

an Enterprise Security System; or a Consumer Security System.

13. A method for controlling client access to an endpoint managed by a host in a computing system (CS) environment using virtual file honeypots (VFHs) under virtual honeypot driver control, the method comprising:

identifying the client and the host for the endpoint computing system environment;

determining VFH parameters based on the endpoint CS environment;

determining that a client process requesting file access to a requested file stored on a storage device of the computing system is untrusted;

determining a level of risk posed to the computing system by the untrusted process;

generating, by the host, at least one VFH based on the determined parameters, wherein the at least one VFH is not stored on the storage device;

providing the untrusted client process access to the at least one VFH and the requested file, wherein a proportion the at least one VFH to the requested file is varied based on the level of risk; and detecting the untrusted client process as malware by performing heuristic analysis after the untrusted client process receives access to the at least one VFH.

14. The method of claim 13, wherein determining that the client process is untrusted comprises at least one of:

determining whether the client process is not identified in a list of trusted processes based on one or more of a certificate, a fingerprint, a name, and a process identifier;

requesting a reputation service for the client process; or analyzing a chain of processes and identifying the client process was created by an untrusted process.

15. The method of claim 13, wherein determining that the client process is untrusted comprises detecting untrusted threads in trusted client processes.

16. The method of claim 13, wherein determining virtual file honeypot parameters comprises:

training a machine learning classifier on at least one pattern in file naming on the storage device, at least one file structure of the storage device, and file content of the storage device; and applying a machine learning classifier to information about the CS environment to determine:

at least one plausible sounding file name, at least one plausible file structure, and at least one plausible file content.

17. The method of claim 13, wherein the identifying the endpoint CS environment comprises receiving identifying information about an endpoint CS type, an endpoint CS name, or an endpoint CS version.

18. The method of claim 13, wherein the identifying the endpoint CS environment comprises receiving identifying information about an operating system type or operating system version.

19. The method of claim 13, wherein the identification of the endpoint CS environment comprises receiving identifying information about at least one of:

file types and extensions;

common file names, file content, or directory structure;

access permissions of files and directories within the endpoint CS;

creation, modification, and access timestamps within the endpoint CS;

sensitive data within the endpoint CS;

file interactions with other components in the endpoint CS;

regulatory and compliance requirements of the endpoint CS; or past cybersecurity incidents or known vulnerabilities within the endpoint CS environment.

20. The method of claim 13, wherein the endpoint CS environment is:

an Industrial Control System (ICS);

an Internet of Things (IoT) system;

a Building Automation Systems (BAS);

15

16 a Healthcare Control System;
a Telecommunications Infrastructure;
a Transportation Control System;
an Enterprise Security System; or
a Consumer Security System.

* * * * *